US012433682B2

(12) United States Patent
Lent et al.

(10) Patent No.: US 12,433,682 B2
(45) Date of Patent: Oct. 7, 2025

(54) MEASUREMENT MARKINGS IN DISTAL TIP IMAGING FIELD OF VIEW

(71) Applicant: BOSTON SCIENTIFIC SCIMED, INC., Maple Grove, MN (US)

(72) Inventors: Eric N. Lent, Roberts, WI (US); Niraj Prasad Rauniyar, Plymouth, MN (US); Steven T. Carlson, St. Paul, MN (US); Robert J. Riker, Sewickley, PA (US); Longquan Chen, Andover, MA (US); Jeffrey A. Meganck, N Grafton, MA (US); Andrea M. Cahill, Cambridge, MA (US); Aaron Silva, Somerville, MA (US)

(73) Assignee: BOSTON SCIENTIFIC SCIMED, INC., Maple Grove, MN (US)

( * ) Notice: Subject to any disclaimer, the term of this patent is extended or adjusted under 35 U.S.C. 154(b) by 510 days.

(21) Appl. No.: 17/685,333

(22) Filed: Mar. 2, 2022

(65) Prior Publication Data
US 2022/0280245 A1    Sep. 8, 2022

Related U.S. Application Data

(60) Provisional application No. 63/155,939, filed on Mar. 3, 2021.

(51) Int. Cl.
*A61B 34/20*  (2016.01)
*A61B 90/00*  (2016.01)

(52) U.S. Cl.
CPC ...... *A61B 34/20* (2016.02); *A61B 2034/2055* (2016.02); *A61B 2034/2065* (2016.02); *A61B 2090/3983* (2016.02)

(58) Field of Classification Search
CPC .. A61B 5/1076; A61B 2090/061; A61B 34/20
See application file for complete search history.

(56) References Cited

U.S. PATENT DOCUMENTS 5,084,022 A    1/1992    Claude
5,417,210 A    5/1995    Funda et al.
(Continued)

FOREIGN PATENT DOCUMENTS

JP    2008523908 A    7/2008
JP    2012529970 A    11/2012
(Continued)

OTHER PUBLICATIONS

International Search Report and Written Opinion for International Application No. PCT/US2022/018581 dated Jun. 27, 2022.

*Primary Examiner* — Amelie R Davis
(74) *Attorney, Agent, or Firm* — Seager, Tufte & Wichem, LLP

(57) ABSTRACT

Methods and devices are provided for determining anatomical distance and/or position measurements during an endoscopic procedure. Markings are placed either physically or superimposed on a distal end of an elongate tool, such that the markings are viewable in an imaging field of view of the endoscope. Anatomic distances may be determined by measurements performed with the tool. The size and/or position of anatomical structures or unknown objects may also be determined using the marked tool.

16 Claims, 15 Drawing Sheets

(56) References Cited

U.S. PATENT DOCUMENTS

| | | | |
|---|---|---|---|
| 5,649,021 A | 7/1997 | Matey et al. | |
| 5,669,871 A | 9/1997 | Sakiyama | |
| 5,693,003 A | 12/1997 | Wöelfelschneider et al. | |
| 6,690,964 B2 | 2/2004 | Bieger et al. | |
| 8,273,079 B2 | 9/2012 | Hoey et al. | |
| 8,730,313 B2 | 5/2014 | Numata | |
| 9,155,592 B2 | 10/2015 | Itkowitz et al. | |
| 9,492,240 B2 | 11/2016 | Itkowitz et al. | |
| 9,601,025 B2 | 3/2017 | Kesavadas et al. | |
| 10,194,927 B2 | 2/2019 | Chu et al. | |
| 10,194,970 B2 | 2/2019 | Hastings et al. | |
| 10,342,593 B2 | 7/2019 | Hastings et al. | |
| 10,441,146 B2 | 10/2019 | Inoue | |
| 10,742,958 B2 | 8/2020 | Yamamoto | |
| 2003/0060842 A1* | 3/2003 | Chin | A61B 17/320016 606/170 |
| 2006/0030753 A1* | 2/2006 | Boutillette | A61B 1/0052 600/153 |
| 2009/0171371 A1* | 7/2009 | Nixon | A61B 34/37 700/264 |
| 2011/0125054 A1 | 5/2011 | Clements et al. | |
| 2013/0245375 A1* | 9/2013 | DiMaio | A61B 34/30 600/166 |
| 2016/0310043 A1 | 10/2016 | Levi et al. | |
| 2019/0265490 A1 | 8/2019 | Duckett, III | |
| 2019/0324261 A1 | 10/2019 | Ogawa | |
| 2021/0256719 A1* | 8/2021 | Hufford | G06T 11/00 |

FOREIGN PATENT DOCUMENTS

| | | |
|---|---|---|
| JP | 2015123201 A | 7/2015 |
| WO | 2010061293 A2 | 6/2010 |
| WO | 2017054817 A1 | 4/2017 |

* cited by examiner

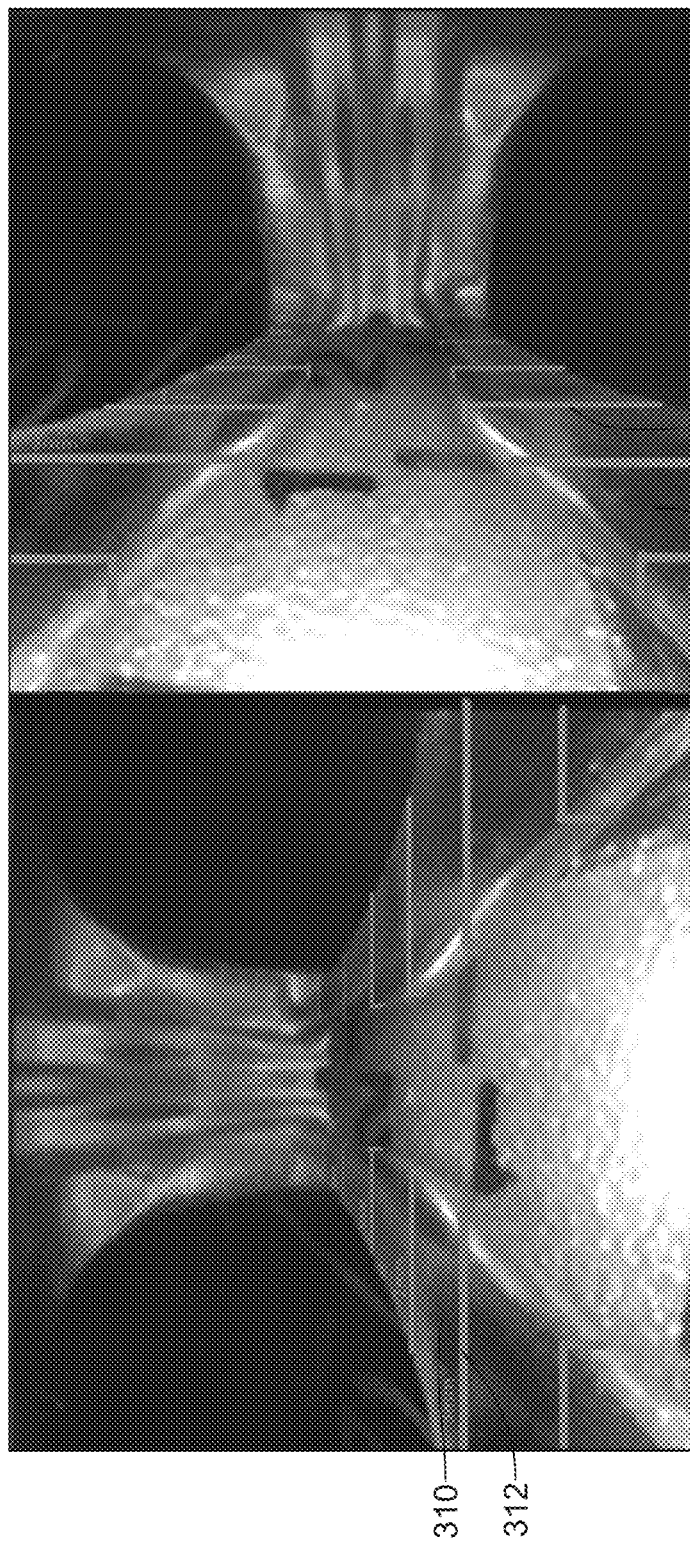

MEASUREMENT MARKINGS IN DISTAL TIP IMAGING FIELD OF VIEW

CROSS REFERENCE TO RELATED APPLICATIONS

This application claims the benefit of and priority to U.S. Provisional Patent application Ser. No. 63/155,939 filed on Mar. 3, 2021, the disclosure of which is incorporated herein by reference.

TECHNICAL FIELD

The disclosure pertains to medical devices and more particularly to measuring devices for endoscopy procedures, and methods for using such medical devices.

BACKGROUND

Benign prostatic hyperplasia (BPH) is a common disorder in middle-aged and older men, involving enlargement of the prostate which results in constriction of the prostatic urethra, causing resistance to urine flow. Treatment may involve injection of vapor into the prostate. An example procedure is the Rezūm™ water vapor procedure, in which sterile water vapor (steam) is injected into the enlarged portions of the prostate. The steam causes the prostate cells that are responsible for the enlargement to die, which then leads to shrinking of the prostate, which in turn creates a more open urinary pathway. The procedure may involve a device such as those described in U.S. Pat. Nos. 8,273,079, 10,194,970, and 10,342,593, all of which are incorporated by reference.

In the Rezūm™ procedure, the physician moves the device distally and finds the bladder neck opening, then moves proximally to find the verumontanum. The prostatic tissue is treated between these two landmarks. With the current Rezūm™ system, one visual frame is about 5 mm, so by counting frames, physicians can estimate prostate length. Similar estimate is also done to figure out height of the prostate gland. This gives a rough estimate on how many injection points and pattern of injection points (straight line or double line or Z pattern etc.) is needed. The current recommendation is having an injection point every 1 cm. There is a hypothesis that if the treatment points are too close this creates risk of unnecessary inflammation of tissue, or if the treatment points are too far apart this creates risk of ineffective treatment. The eye-balling method that is used today is highly susceptible to this variability. There is an ongoing need to provide clear measurement marking devices and methods.

With any imaging system, users need to know the actual physical size of an object being displayed to accurately interpret the image. For optical imaging systems imaging a 2D scene at a fixed point in space, this is commonly achieved by calibrating the optical parameters of the system, such as focus length and distortion, and using information to compute a pixel size (frequently displayed using scale bars). This is not possible in monocular optical imaging systems that image a 3D scene with significant depth. In these systems, while the image sensor pixel size is fixed, the physical size of the object being displayed depends on the distance of that object from the collection optics. Two objects of identical size may appear to be different in the image; the object further from the optics will appear smaller.

This is a common problem in all endoscopy systems. It is particularly important to solve this problem for ureteroscopic procedures. Knowing the physical size of a kidney stone (and/or residual stone fragments) can directly impact procedural decision making and overall procedural efficiency. Optical calibration alone is not adequate in ureteroscopic applications between anatomical features and/or stone fragments will have a significant range of distances from the primary objective lens.

In current practice, the field of view size is estimated using and intuitive comparison with an object of known diameter (e.g. comparing size of stone via to an adjacent laser fiber). This intuition is commonly built through repetitive sizing error during procedures, which is an inherently flawed approach. It also takes a significant amount of time for surgeons to develop this intuition. Providing guidance during this crucial sizing step will increase procedure efficacy, facilitate standardization of care, and improve patient safety.

SUMMARY

This disclosure provides design, material, manufacturing method, and use alternatives for medical devices. An example system for providing anatomical distance measurements during an endoscopic procedure comprises an elongate tool having first markings on a distal end of the elongate tool, the first markings extending longitudinally along the tool and configured to be viewable in an imaging field of view of an endoscope, and a video processor configured to display the first markings as virtual markings in the field of view image, the first markings including reference lines spaced equidistantly apart, preferably 1 mm apart, and extending longitudinally along the tool.

Alternatively or additionally to the embodiment above, the video processor is further configured to display second virtual markings representing anatomical structures viewable in the field of view.

Alternatively or additionally to any of the embodiments above, the video processor is further configured to superimpose the virtual markings onto a distal end of the tool and keep the virtual markings in place relative to the tool when the tool is rotated and moved axially.

Alternatively or additionally to any of the embodiments above, the system further comprises a tilt and/or rotation sensor configured to sense tilt and/or rotation of the tool so the virtual markings remain in place relative to the tool.

Alternatively or additionally to any of the embodiments above, the virtual markings are scaled in size to depict depth.

Alternatively or additionally to any of the embodiments above, a portion of the markings are physical markings on the tool and a portion of the markings are virtual and viewable in the field of view.

An example device for providing anatomical distance measurements during an endoscopic procedure comprises an elongate tool having first markings on a distal end of the elongate tool, the first markings extending longitudinally along the tool and configured to be viewable in an imaging field of view of an endoscope.

Alternatively or additionally to the embodiment above, the first markings are physical lines on the tool transverse to a longitudinal axis of the tool, the lines placed 1 mm apart longitudinally along opposite sides of the tool.

Alternatively or additionally to any of the embodiments above, the device further includes second physical markings including lines spaced 5 mm apart longitudinally along at least one side of the tool.

Alternatively or additionally to any of the embodiments above, the tool has a width with second physical markings extending across the width in 1 mm increments, wherein the first and second physical markings are visually different.

Alternatively or additionally to any of the embodiments above, the first markings include a geometric pattern painted on the tool, wherein regions of the geometric pattern have known dimensions.

Alternatively or additionally to any of the embodiments above, the first markings are grooves in or raised markings on the tool.

An example method for providing anatomical distance measurements during an endoscopic procedure comprises placing first markings on a distal end of an elongate tool, the first markings extending longitudinally along the tool and configured to be viewable in an imaging field of view of an endoscope, extending the elongate tool through the endoscope until the first markings are viewable in the imaging field of view, and measuring anatomical distances based on the first markings.

Alternatively or additionally to the embodiment above, the first markings are physical lines on the tool transverse to a longitudinal axis of the tool, the lines placed 1 mm apart longitudinally along opposite sides of the tool.

Alternatively or additionally to any of the embodiments above, the method further includes second physical markings including lines spaced 5 mm apart longitudinally along at least one side of the tool.

Alternatively or additionally to any of the embodiments above, the tool has a width with second physical markings extending across the width in 1 mm increments, wherein the first and second physical markings are visually different.

Alternatively or additionally to any of the embodiments above, the first markings include a geometric pattern painted on the tool, wherein regions of the geometric pattern have known dimensions, wherein the method further comprises determining size and/or position of an unknown object in the field of view by comparing viewed dimensions of the unknown object to the known dimensions of the geometric pattern on the tool.

Alternatively or additionally to any of the embodiments above, the first markings are grooves in or raised markings on the tool.

Alternatively or additionally to any of the embodiments above, the first markings are virtual markings displayed in the field of view image by a processor, the first markings including reference lines spaced 1 mm apart and extending longitudinally along the tool.

Alternatively or additionally to any of the embodiments above, the method further comprises second virtual markings representing anatomical structures viewable in the field of view.

Alternatively or additionally to any of the embodiments above, the virtual markings are superimposed onto a distal end of the tool and remain in place relative to the tool when the tool is rotated and moved axially.

Alternatively or additionally to any of the embodiments above, the method further comprises a tilt and/or rotation sensor configured to sense tilt and/or rotation of the tool so the virtual markings remain in place relative to the tool.

Alternatively or additionally to any of the embodiments above, the virtual markings are scaled in size to depict depth.

Alternatively or additionally to any of the embodiments above, a portion of the markings are physical markings on the tool and a portion of the markings are virtual and viewable in the field of view.

An example method of identifying a tool in an endoscopic field of view comprises applying a different geometric pattern on a portion of each of a plurality of tools, inserting at least one of the plurality of tools through an endoscope, and identifying when one of the plurality of tools enters into the field of view based on the geometric pattern seen in the field of view.

Alternatively or additionally to the embodiment above, the method further includes determining rotational and axial positions of the tool based on the geometric pattern.

Alternatively or additionally to any of the embodiments above, the geometric patterns are painted on the tools using at least two high-contrast colors.

Alternatively or additionally to any of the embodiments above, the geometric patterns include alternating black and white regions.

Alternatively or additionally to any of the embodiments above, the geometric patterns include lines of varying thickness positioned at graduated intervals.

Alternatively or additionally to any of the embodiments above, each tool has a distal tip and shaft, wherein the distal tip has a first pattern and the shaft has a second pattern that is different from the first pattern.

Alternatively or additionally to any of the embodiments above, the method further comprises determining the size and/or position of an anatomical structure or unknown object seen in the field of view by placing the tool adjacent the structure or object and comparing an outline of the structure or object to the geometric pattern on the tool.

An example method of determining positional and/or size information about an unknown object or anatomical structure within a patient's body comprises inserting an endoscope with a camera and light source into the patient's body, transmitting an image of the unknown object or anatomical structure using the endoscope, displaying the transmitted image, inserting a tool with a geometric pattern through the endoscope and positioning the tool adjacent the unknown object or anatomical structure, wherein the dimensions of the geometric pattern are known, determining positional and/or size information about the unknown object or anatomical structure by comparing the unknown object or anatomical structure to the geometric pattern.

The above summary of some embodiments, aspects, and/or examples is not intended to describe each embodiment or every implementation of the present disclosure. The figures and the detailed description which follows more particularly exemplify these embodiments.

BRIEF DESCRIPTION OF THE DRAWINGS

The disclosure may be more completely understood in consideration of the following detailed description of various embodiments in connection with the accompanying drawings, in which:

FIGS. 8A and 8B illustrate virtual markings superimposed on a treatment device with the image rotated 90 degrees in FIG. 8B;

Figure 1:
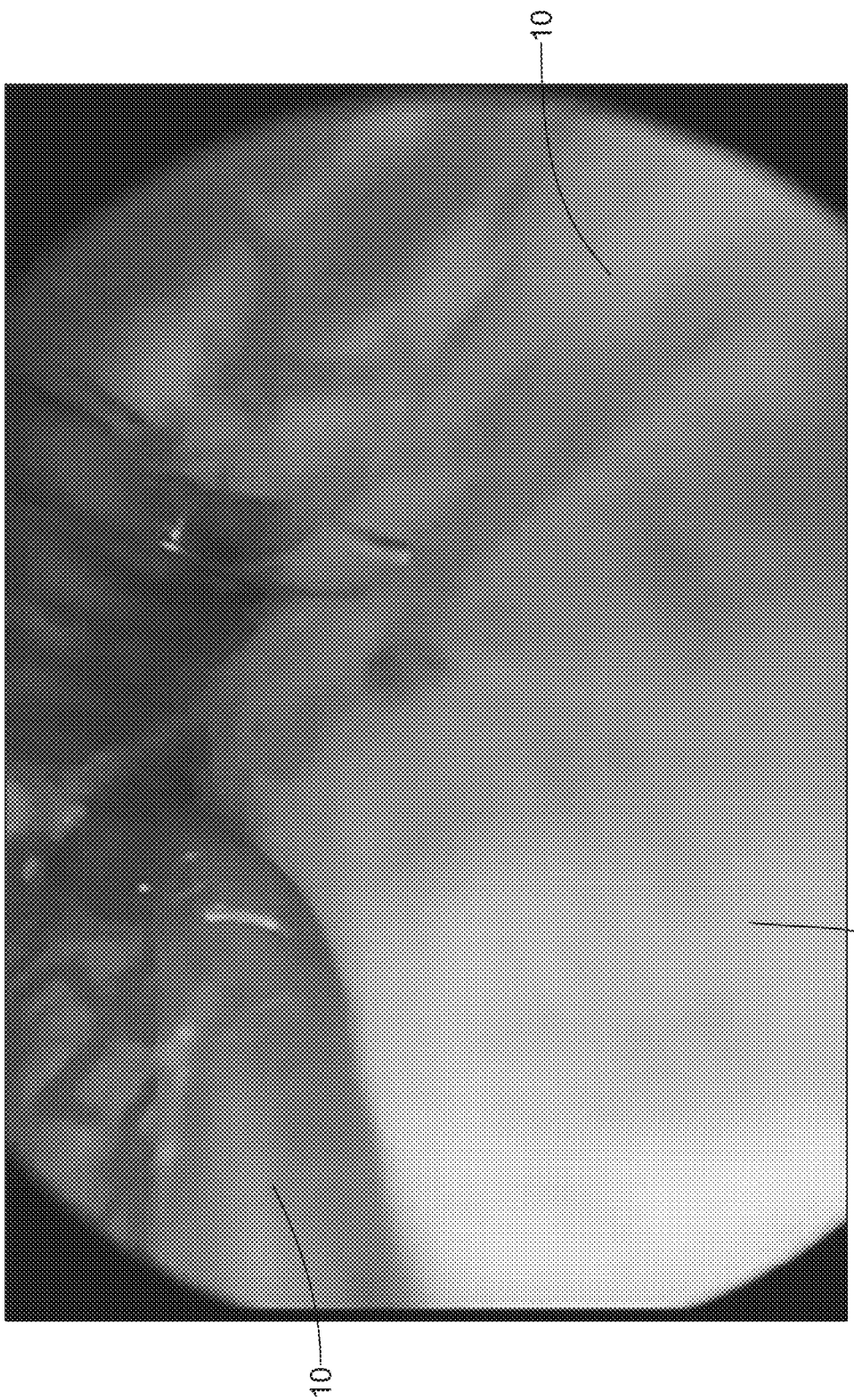
FIG. 1 illustrates the distal tip of a treatment device in an imaging field of view.

While aspects of the disclosure are amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DETAILED DESCRIPTION

For the following defined terms, these definitions shall be applied, unless a different definition is given in the claims or elsewhere in this specification.

All numeric values are herein assumed to be modified by the term "about," whether or not explicitly indicated. The term "about", in the context of numeric values, generally refers to a range of numbers that one of skill in the art would consider equivalent to the recited value (e.g., having the same function or result). In many instances, the term "about" may include numbers that are rounded to the nearest significant figure. Other uses of the term "about" (e.g., in a context other than numeric values) may be assumed to have their ordinary and customary definition(s), as understood from and consistent with the context of the specification, unless otherwise specified.

The recitation of numerical ranges by endpoints includes all numbers within that range, including the endpoints (e.g., 1 to 5 includes 1, 1.5, 2, 2.75, 3, 3.80, 4, and 5). Although some suitable dimensions, ranges, and/or values pertaining to various components, features and/or specifications are disclosed, one of skill in the art, incited by the present disclosure, would understand desired dimensions, ranges, and/or values may deviate from those expressly disclosed.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise. It is to be noted that in order to facilitate understanding, certain features of the disclosure may be described in the singular, even though those features may be plural or recurring within the disclosed embodiment(s). Each instance of the features may include and/or be encompassed by the singular disclosure(s), unless expressly stated to the contrary. For simplicity and clarity purposes, not all elements of the disclosure are necessarily shown in each figure or discussed in detail below. However, it will be understood that the following discussion may apply equally to any and/or all of the components for which there are more than one, unless explicitly stated to the contrary. Additionally, not all instances of some elements or features may be shown in each figure for clarity.

Relative terms such as "proximal", "distal", "advance", "withdraw", variants thereof, and the like, may be generally considered with respect to the positioning, direction, and/or operation of various elements relative to a user/operator/manipulator of the device, wherein "proximal" and "withdraw" indicate or refer to closer to or toward the user and "distal" and "advance" indicate or refer to farther from or away from the user. In some instances, the terms "proximal" and "distal" may be arbitrarily assigned in an effort to facilitate understanding of the disclosure, and such instances will be readily apparent to the skilled artisan. Other relative terms, such as "upstream", "downstream", "inflow", and "outflow" refer to a direction of fluid flow within a lumen, such as a body lumen, a blood vessel, or within a device.

The term "extent" may be understood to mean a greatest measurement of a stated or identified dimension, unless the extent or dimension in question is preceded by or identified as a "minimum", which may be understood to mean a smallest measurement of the stated or identified dimension. For example, "outer extent" may be understood to mean a maximum outer dimension, "radial extent" may be understood to mean a maximum radial dimension, "longitudinal extent" may be understood to mean a maximum longitudinal dimension, etc. Each instance of an "extent" may be different (e.g., axial, longitudinal, lateral, radial, circumferential, etc.) and will be apparent to the skilled person from the context of the individual usage. Generally, an "extent" may be considered a greatest possible dimension measured according to the intended usage, while a "minimum extent" may be considered a smallest possible dimension measured according to the intended usage. In some instances, an "extent" may generally be measured orthogonally within a plane and/or cross-section, but may be, as will be apparent from the particular context, measured differently—such as, but not limited to, angularly, radially, circumferentially (e.g., along an arc), etc.

The terms "monolithic" and "unitary" shall generally refer to an element or elements made from or consisting of a single structure or base unit/element. A monolithic and/or unitary element shall exclude structure and/or features made by assembling or otherwise joining multiple discrete elements together.

It is noted that references in the specification to "an embodiment", "some embodiments", "other embodiments", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to effect the particular feature, structure, or characteristic in connection with other embodiments, whether or not explicitly described, unless clearly stated to the contrary. That is, the various individual elements described below, even if not explicitly shown in a particular combination, are nevertheless contemplated as being combinable or arrangeable with each other to form other additional embodiments or to complement and/or enrich the described embodiment(s), as would be understood by one of ordinary skill in the art.

For the purpose of clarity, certain identifying numerical nomenclature (e.g., first, second, third, fourth, etc.) may be used throughout the description and/or claims to name and/or differentiate between various described and/or claimed features. It is to be understood that the numerical nomenclature is not intended to be limiting and is exemplary only. In some embodiments, alterations of and deviations from previously-used numerical nomenclature may be made in the interest of brevity and clarity. That is, a feature identified as a "first" element may later be referred to as a "second" element, a "third" element, etc. or may be omitted entirely, and/or a different feature may be referred to as the "first" element. The meaning and/or designation in each instance will be apparent to the skilled practitioner.

The following description should be read with reference to the drawings, which are not necessarily to scale, wherein similar elements in different drawings are numbered the same. The detailed description and drawings are intended to illustrate but not limit the disclosure. Those skilled in the art will recognize that the various elements described and/or shown may be arranged in various combinations and configurations without departing from the scope of the disclosure. The detailed description and drawings illustrate example embodiments of the disclosure. However, in the interest of clarity and ease of understanding, while every feature and/or element may not be shown in each drawing, the feature(s) and/or element(s) may be understood to be present regardless, unless otherwise specified.

Many endoscopic medical procedures would benefit from measurement markings appearing within the field of view of an imaging catheter to allow the physician to better estimate physical dimensions when diagnosing illness or delivering therapy. Utilizing the imager system field of view, the distal portion of a device can be marked to provide reference measurement in both axial and vertical direction. Additionally, marking can be used to size the channel and orientation of the device. For example, the depth of focus or depth of field of an example imager system may be about 5 mm to about 50 mm. The total length of the distal tip of a treatment device may be about 15 mm long and about 5 mm tall. The entire distal tip may be visible with the imager lens. FIG. 1 shows the distal tip of a BPH treatment device 10 extending into an imaging field of view 5. The treatment device 10 may be an elongate tool. The treatment may involve injecting vapor at various locations in the prostate.

Figure 2:
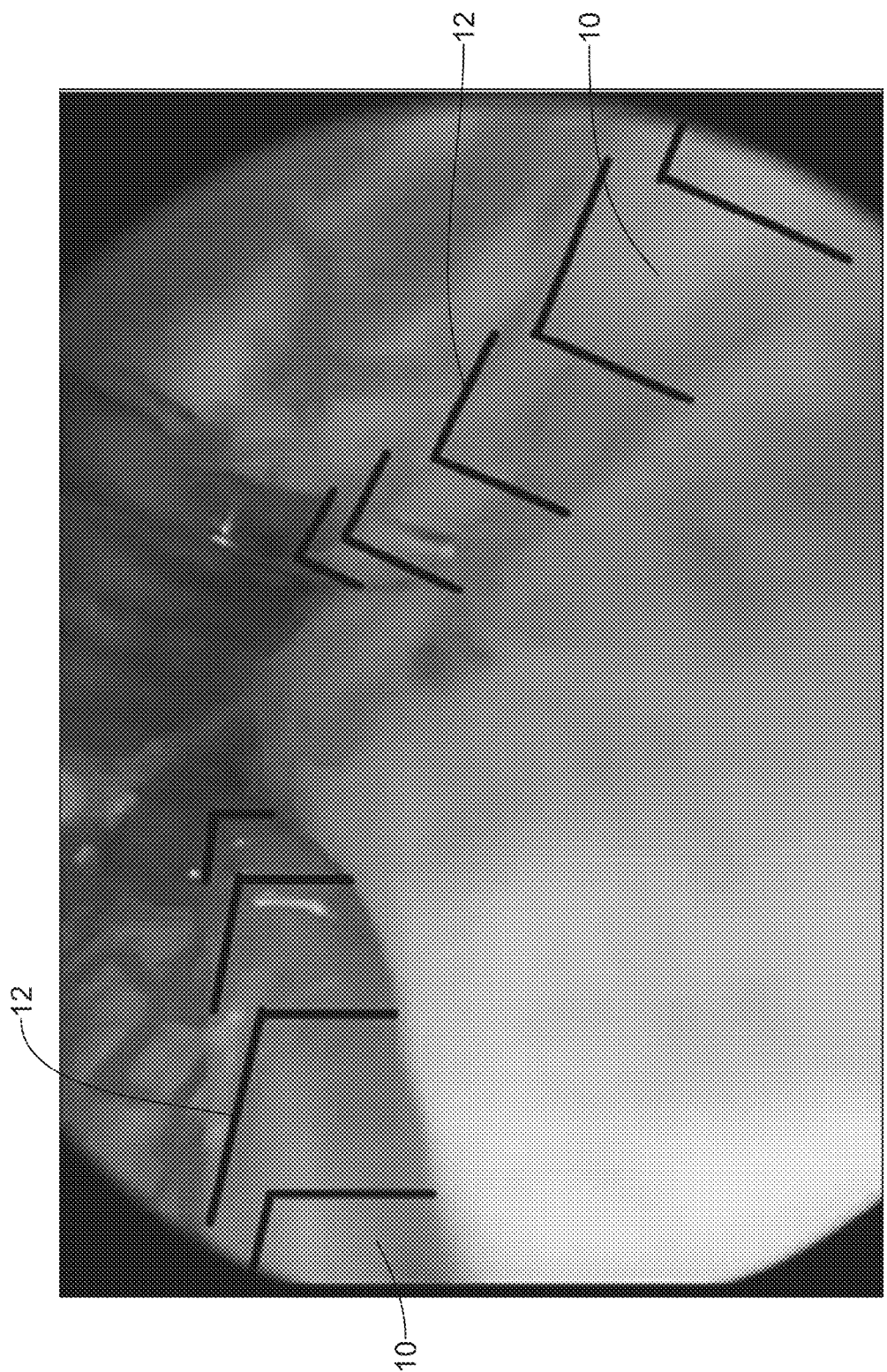
FIG. 2 illustrates the treatment device of FIG. 1 with reference markers disposed 1 mm apart on the distal tip.

In some examples, the physician may prefer to measure down from the bladder opening about 1 cm to the first needle injection point. FIG. 2 shows marking lines 12 drawn in black 1 mm apart on the distal tip surface of the treatment device 10 from FIG. 1. In combination with common anatomical features that can be observed in the prostate, the markings 12 may allow the physician to more accurately place the injection location as the device 10 is moved downward in the prostate from the bladder. The lines or markings 12 may be drawn onto the surface of the device 10, as shown in FIG. 2. In other examples, the markings may be molded, etched, or cut into the surface of the device. Units of measure may also be placed adjacent the markings or onto another region of the tip, e.g. "mm" to indicate millimeters. For markings drawn onto the distal tip of the device, any color marking may be used, depending on the color of the device and surrounding tissue to be treated. In some examples, black markings may be used. In other examples, bright or fluorescent markings may be used, such as yellow, orange or green.

Figure 3:
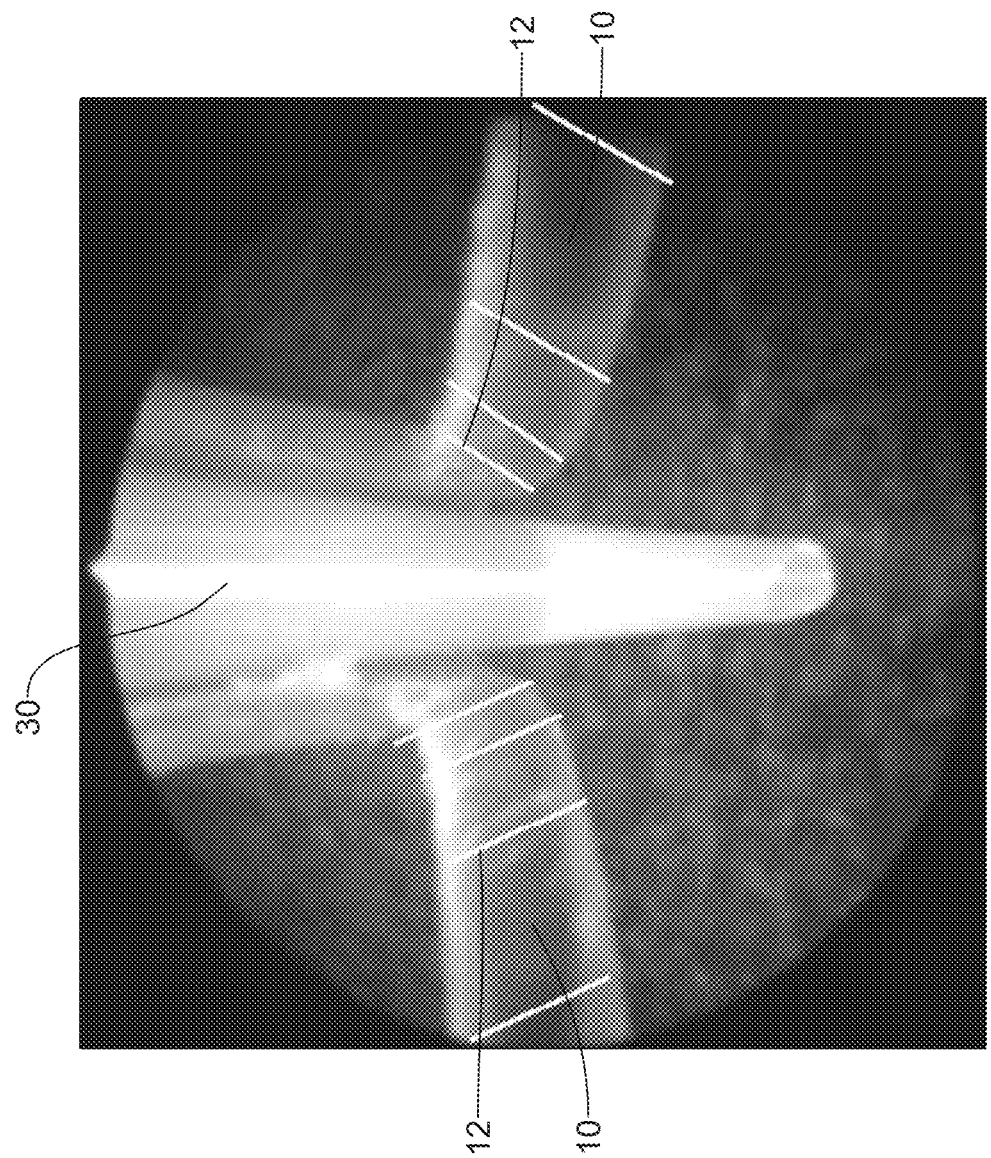
FIG. 3 illustrates the operator's view through a cystoscope with a needle deployed, with reference markers disposed 1 mm apart.
Figure 4:
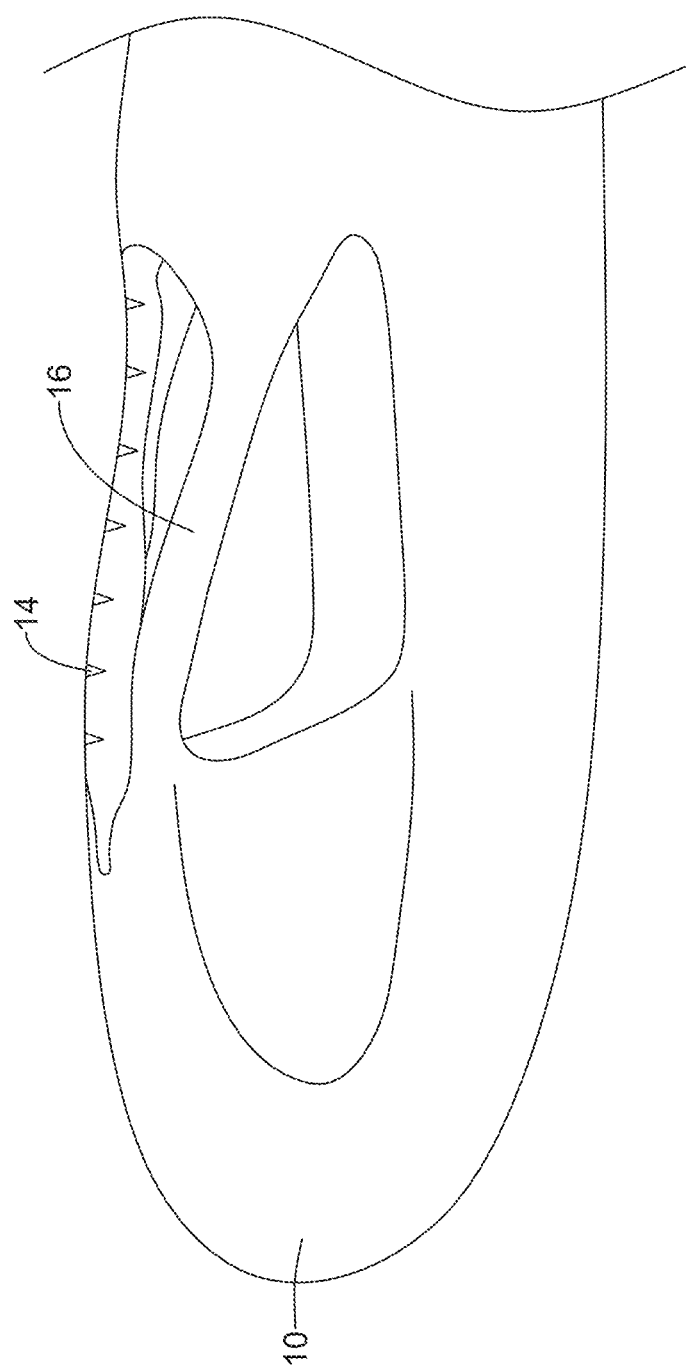
FIG. 4 is a perspective view of the distal tip of a treatment device with grooves disposed 1 mm apart.
Figure 5:
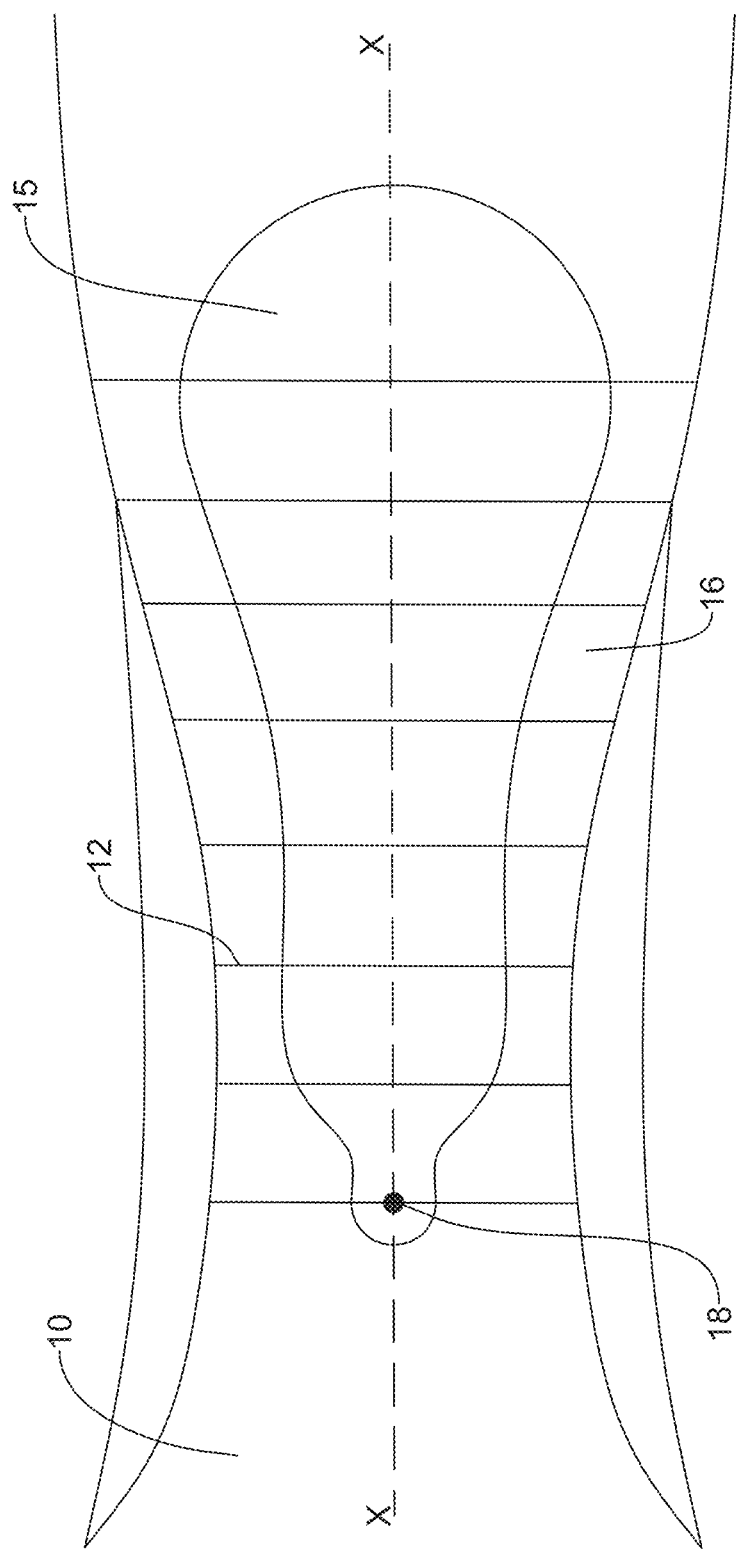
FIG. 5 is a top view of the distal tip of a treatment device with markings at 1 mm intervals from a needle injection point.

FIG. 3 shows the physician's view from a 30° Cystoscope with a needle 30 deployed, giving a perspective view of the device 10. The marking lines 12 indicate millimeter spacing and also provide an indication of depth, as the marking lines appear closer together in the lower portions of the field of view. In other examples, the markings may be in the form of grooves 14 cut into the surface of the distal region of the tool. FIG. 4 shows the distal end of the device 10 with a series of grooves 14 cut into the struts 16. The grooves 14 may be in millimeter increments. The grooves 14 may be cut into one or both struts 16. In further examples, the markings may be raised markings extending above the surface of the tool. FIG. 5 shows a top view of the device 10 with a series of markings 12 extending transverse to the longitudinal axis x-x. In some examples the markings 12 may extend across the struts 16 and across the interior 15 of the device. The circle 18 serves as a reference point of a needle injection point, or "zero marking", from where the millimeter increments of the markings are measured.

Figure 6:
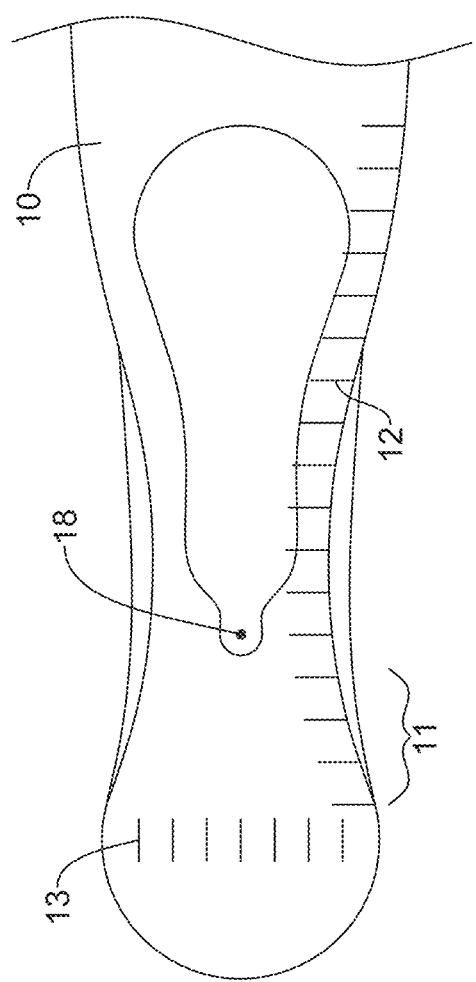
FIG. 6 illustrates the distal tip of a treatment device with vertical and horizontal markings at 1 mm intervals.

In another example, the entire length and width of the distal tip of the device 10 may be for marking. In the example shown in FIG. 6, the tip of the device 10 is about 15 mm long and about 5 mm wide. The markings 12 extending longitudinally may be provided in a different manner than the width markings 13. In some examples, the longitudinal markings 12 may be a different color than the width markings 13. In other examples, one set of markings 12, 13 may be painted on and the other set may be grooves cut into the surface of the device 10. The different sets of markings 12, 13 may provide orientation as well as size references. The marking 12, 13 may include minor markings, such as every mm or half mm, and major markings, such as every 5 mm or 10 mm. In some examples, the longitudinal markings 12 may end at the zero marking 18, with the four marks 11 shown distal to the zero marking 18 being omitted.

An example treatment method may include the following steps: (1) physician finds the distal bladder neck opening; (2) at this view point, the physician can see landmarks in the anatomical wall as well as marking on the distal tip of the device; (3) physician mentally makes a note of where the desired length is; and (4) the physician backs the device to that desired anatomical position. The same process may be followed when the physician is looking at the roof and floor of the prostate to measure the height of the anatomy. With the aid of the markers 12, the total length and height of the prostate can be measured, thus providing an optimal injection pattern and injection points.

Figure 7:
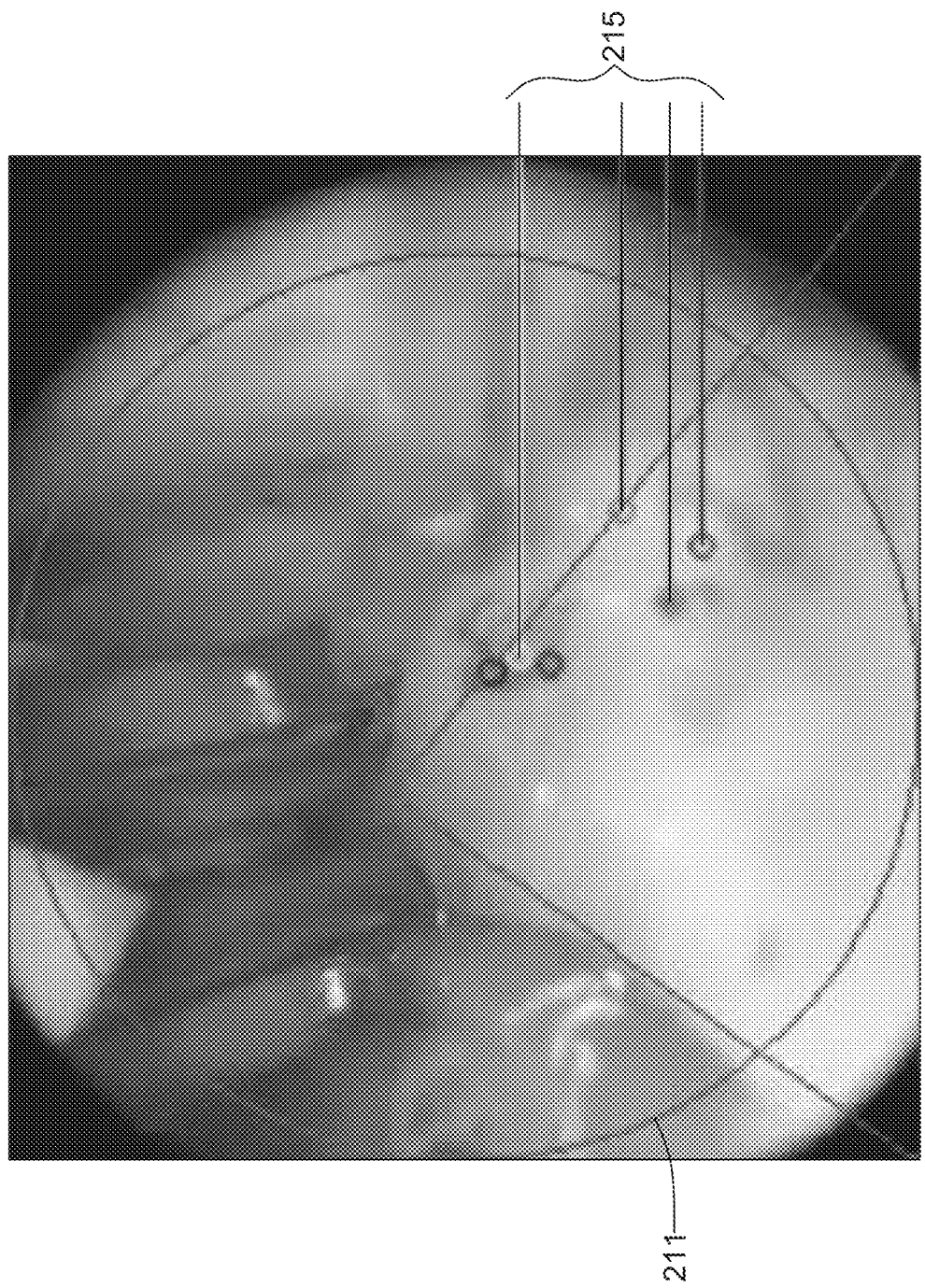
FIG. 7 illustrates virtual markings superimposed on an imaging field of view with a treatment device.

In another example, an additional digital or computed marking scheme may be provided to aid measurement capability for machine learning. Using regions of interest detected within the field of view (e.g. darker tissue sections or blood vessels in the anatomy), and knowing distances within the field of view referenced from body tissue, accurate measurements can be displayed to the physician along with a reference marker scheme. As shown in FIG. 7, a processor may provide a circular marking 211 as well as orientational markings 215 in the distal tip at known focal length that may help as a basis for sizing and depth perception for machine learning/artificial intelligence (AI) work. The markings may be selected by an algorithm based on intensity gradient patterns. For example, surface vessel features may be selected. In other examples, the markings may reference polyps or cancerous tissue.

FIGS. 8A and 8B illustrate a system including a video processor that leverages the imager-based visualization system to overlay virtual measurement markers 312 onto the tip of the tool 310 via software. In this embodiment, because the tip features are fixed relative to the camera, software can easily be used to add detailed markings 312 and text, such as "1 mm, 2 mm", etc. to the tip geometry to aid in navigation. When used in combination with a tilt/rotation sensor within the device, these marking may also turn along with the tip when software is used to orient the image appropriately. FIG. 8A depicts the tip aligned vertically, and FIG. 8B depicts how the image would look when the user has turned the device 90 degrees.

The tip markings 312 shown are just examples, but the lines could also stretch across the entire screen. Furthermore, software would give the user the option to turn off these markings depending on preference, or dial up/down their brightness and contrast. The marking lines 312 could be scaled in size to depict depth as shown in FIGS. 8A and 8B. Finally, colors could be chosen to optimize visibility against anatomical feature, or to meet other customer needs. This software embodiment eliminates the costs and constraints associated with physical markings. In other examples, the virtual markings shown in FIGS. 8A and 8B may be used in combination with physical markings on the device, as shown in FIGS. 2-6.

It will be understood that the dimensions described in association with the above figures are illustrative only, and that other dimensions are contemplated. In addition to the Rezūm™ system for treating BPH, the described markings may be added to other medical devices that have a portion visible within the field of view of a camera image. The markings allow the physician to more accurately and consistently place injections or other therapies, which may reduce pain and discomfort after the procedure. The markers may also reduce errors in treatment and reduce the need for repeat procedures. For example, in a Rezūm™ procedure, if the original injections were too close together or too far apart, medical risks increase because of the need for additional future treatments.

In addition to the above described incremental markings disposed on or projected onto a treatment device, contrasting geometric patterns on the tools themselves may provide additional information, including indicating (1) when a new tool enters the field of view, (2) what type of tool it is, and (3) the position of the tool relative to the camera. Any video processor or processing system for ureteroscopes, and endoscopes in general, will benefit from this type of tool identification system. Currently all artificial intelligence (AI)/machine learning (ML) algorithms are inferring the information from the field of view coming out of the imager (e.g. digital chip).

Contrasting geometric patterns on the tools themselves can provide all three of the above types of information, and with careful design can maximize detectability, manufacturability, and the signal-to-noise ratio of the geometric and tool-identifying information. Additionally, some geometric designs permit on the fly calibration of single-use devices (SUDs) that may have variability in their optical geometry. The tools can be any substance in the field of view (FOV), e.g., guidewire, laser fibers, baskets, etc.

Assuming a given tool has a region of circular cross-section near the tip that is suitable for marking, e.g., with a surface treatment affecting reflectivity, a design with two or more bands of alternating sectors, with the bands offset from one another, could be used to create something like a checkerboard pattern. Even numbers of sectors, sized such that at least two dark-light transitions are visible from any rotation, require sector counts of 6, 8, 10, etc., with sizes of 60°, 45°, 36°, etc. Counts of 8 or more would permit three transitions to be visible in each band, and thereby add an additional data channel by varying the dark/light area ratio within a limited range around the above means. The sector count itself would provide a data point, though manufacturability and imaging constraints will limit the maximum number. Adjacent bands would be similarly constructed such that dark sectors in one band are mostly above light sectors in the adjacent band, but a shift from a perfectly aligned checkerboard pattern would provide an additional data value.

Figure 9B:
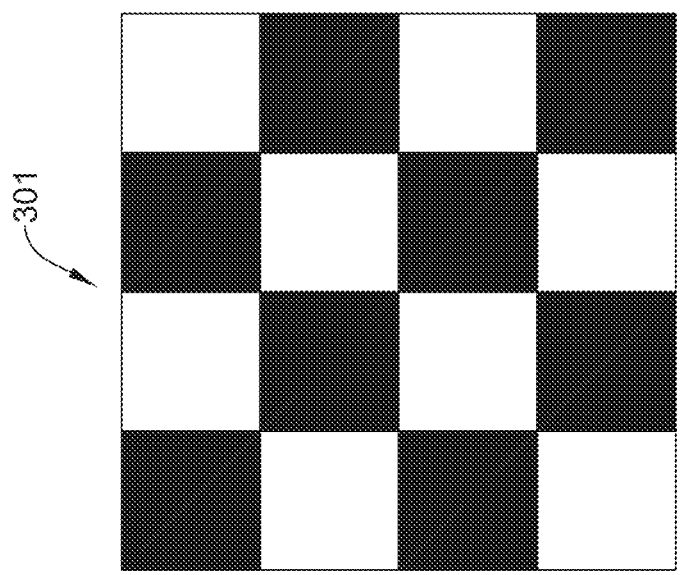
FIGS. 9A and 9B illustrate geometric patterns for use on treatment tools.
Figure 9A:
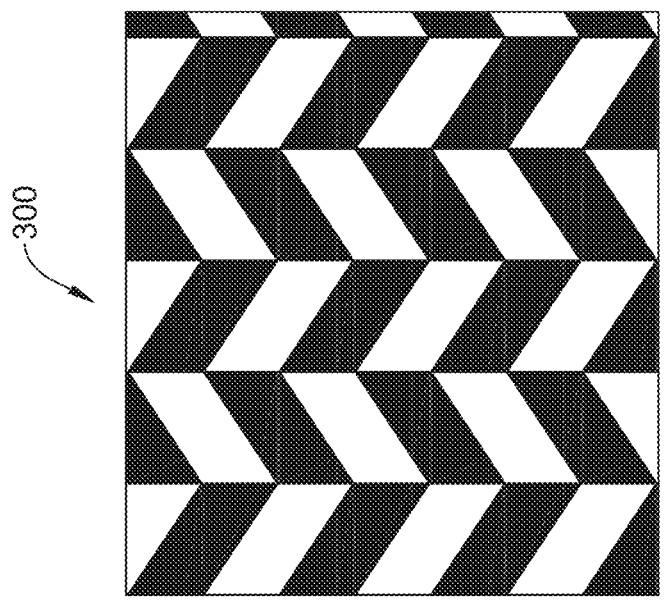

The patterns 300, 301 shown in FIGS. 9A and 9B provide multi-pixel high contrast linear and arc boundaries along and around the tool, respectively, which will support more accurate inferences of tool geometry, independent of orientation in the FOV. The dimensions of the individual blocks or color are known, providing additional measuring references for determining the size of an unknown object in the field of view, as discussed above. This method can also be less resource intensive within an embedded environment where real-time decision making is imperative.

Figure 10:
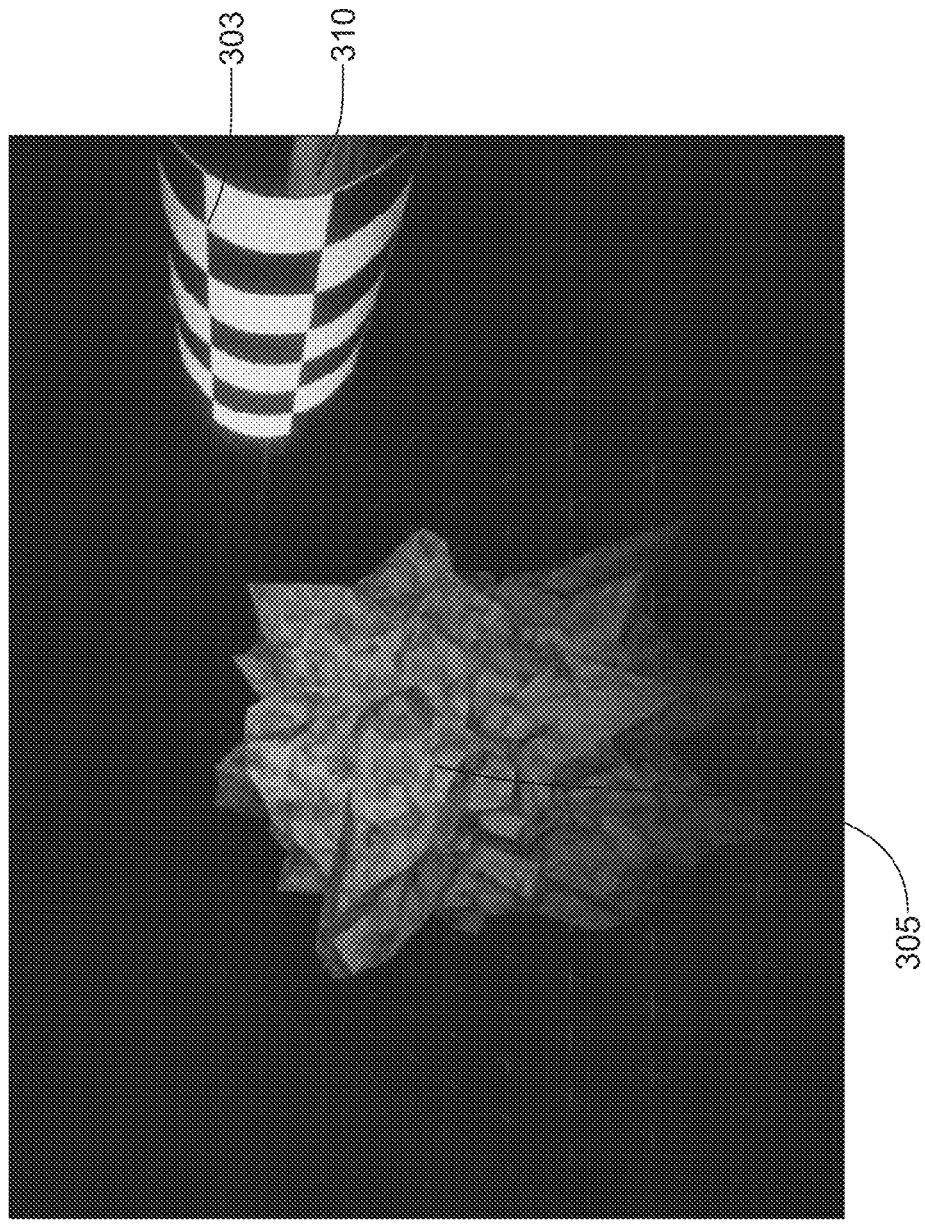
FIG. 10 illustrates an imaging field of view showing a tool with a geometric pattern.

FIG. 10 illustrates an example pattern 303 as it may appear from a ureteroscope perspective on a tool 310 in the working channel adjacent a kidney stone 305. The known measurements of the pattern 303 may be used to determine the physical size and/or position of the stone 305, which may aid in determining a course of treatment and removal of the stone 305.

Alternate pattern embodiments include a simple graduated scale on the tool, such as on the tool shaft, to provide linear details, or lines of varying thickness and/or at varying known intervals to provide both depth as well as a linear scale. In another embodiment, a graduated marking on the guidewire may also be used to measure the length of the ureter for stent sizing. This direct visualization may provide for a more precise measurement of the stent needed. In a further embodiment, the white balance of the camera system may be assessed and adjusted based on the white markings. Alternatively, varying the color markings while still maintaining a high contrast on the geometrical patterns, such as a simple red, green, blue (RGB) or cyan, magenta, yellow, and black (CMYK) can be used for assessing trueness of color of objects and structures in the field of view. Turbidity detection, including blood in the scene and/or other particles, may be achieved by counting the number of sectors of a known pattern that are detected. Turbidity and particles may obscure some pattern sectors, so counting the visible sectors may provide an indication of turbidity. In still further embodiments a simple pattern of intersecting lines, such as in the shape of an "L", "T", or +, may be used as a measurement guide, particularly when the lines are equal in length.

Figure 11:
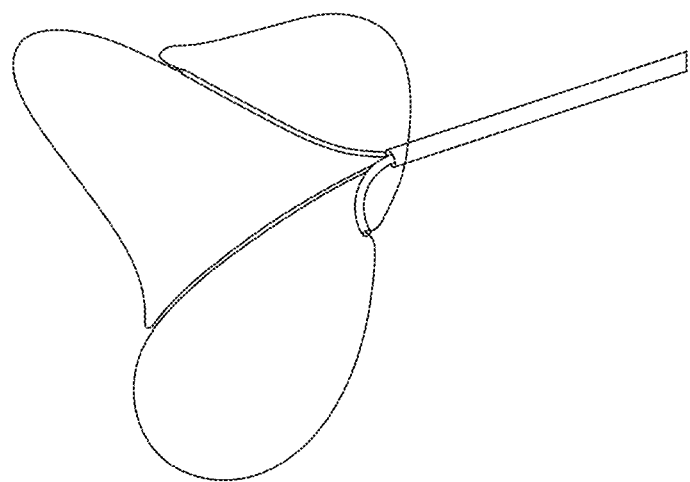
FIGS. 11-14 illustrate retrieval devices that may be sized and used to reference the physical size of an object in the field of view of an imaging device.
Figure 12:
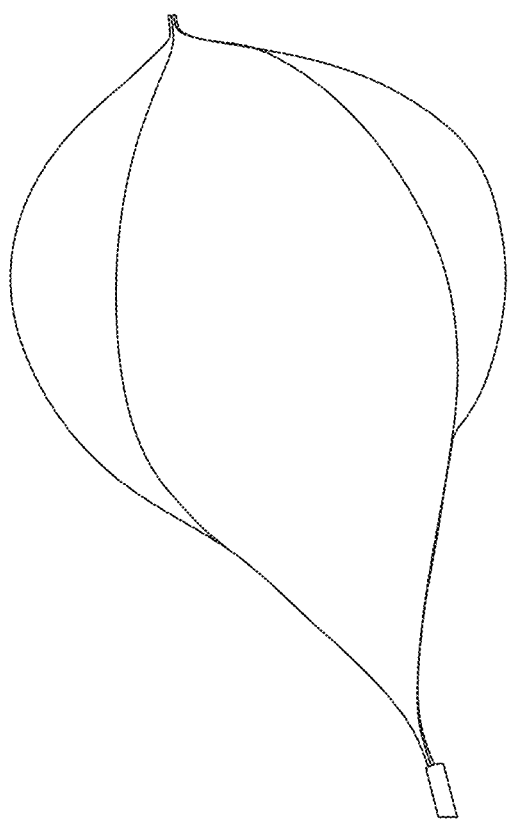
Figure 13:
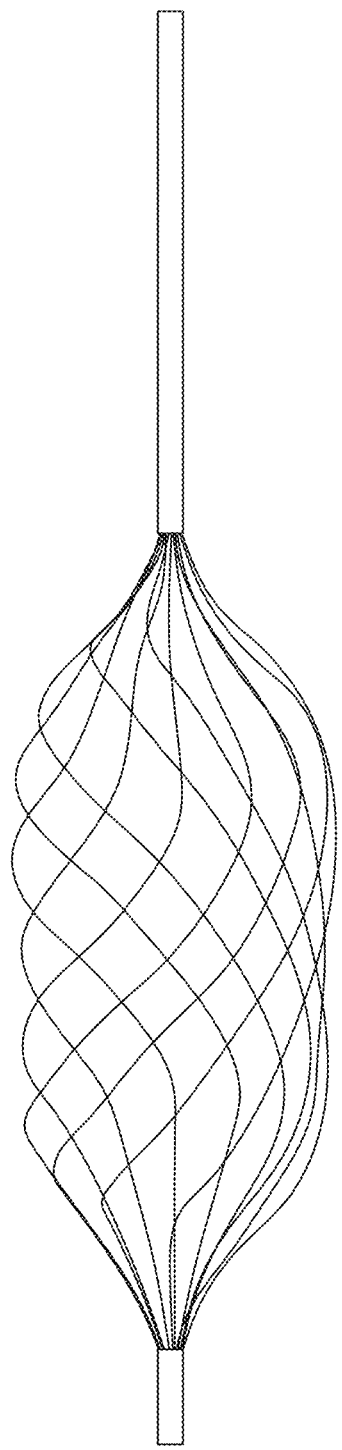
Figure 14:
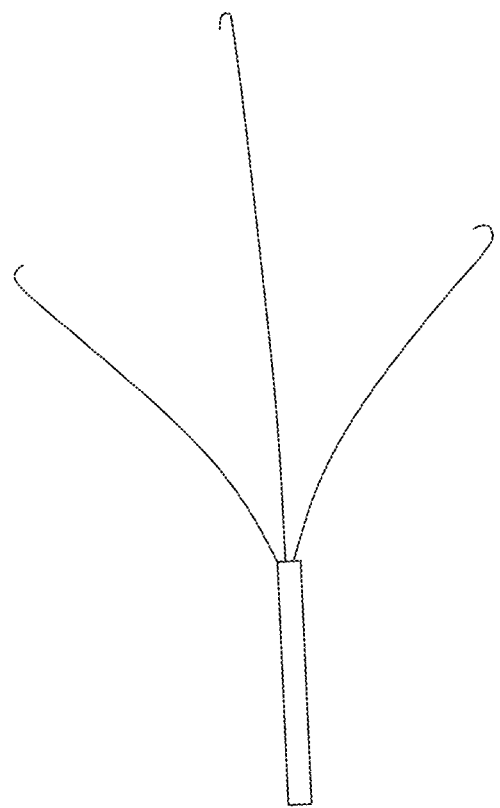
Figure 15B:
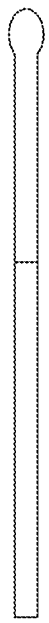
FIGS. 15A and 15B illustrate optical fibers that may be used to reference the physical size of an object in the field of view of an imaging device.
Figure 15A:
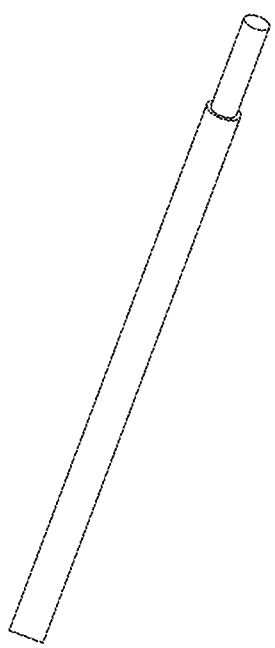

The image analysis algorithms and geometric patterns may also be used to detect the type of tool seen in the field of view, and then reference physical size using the known tool dimensions. Each type of tool may be uniquely colored and shaped. FIGS. 11-14 show different retrieval devices that may be used to retrieve kidney stones. FIG. 11 shows the Dakota™ nitinol stone retrieval device, FIG. 12 shows the Escape™ nitinol stone retrieval basket, FIG. 13 shows the LithoCatch™ immobilization device, and FIG. 14 shows the Tricep™ grasping forceps, all by Boston Scientific. In addition to the retrieval tools, optical fibers used in the procedures may also be used for size referencing. FIG. 15A shows the AccuMax™ holmium laser fiber with a flat end and FIG. 15B shows the Flexiva™ TracTip™ laser fiber with a ball end, both by Boston Scientific. As the diameter and end shapes are known and have standard measurements, the laser fibers may be used to determine the size of stones or other anatomical structures in the field of view. The different shapes and sizes of the tools may provide natural information that can be detected using image processing algorithms. This may be plausible with both classical image processing algorithms, or more advanced AI/ML algorithms.

In addition to using the known dimensions of the various tools to measure objects seen in the field of view of the imaging device, the type of the tool may be detected and used to correlate to reference information a priori about tool feature physical size. For common areas, e.g. laser fibers with similar coloring, but varying sizes, input from the user may be needed to identify the tool. Detection of the tool may be performed using classical image processing and machine vision technologies. Alternatively, detection of the tool may be done using an AI approach where a pre-trained network is provided to determine what tool type and size is present in the field of view. In another example, differences in the measured size of the shaft and tip of a detected tool may be used to estimate changes in the optical geometry over the scene to infer physical pixel sizes.

It should be understood that this disclosure is, in many respects, only illustrative. Changes may be made in details, particularly in matters of shape, size, and arrangement of steps without exceeding the scope of the disclosure. This may include, to the extent that it is appropriate, the use of any of the features of one example embodiment being used in other embodiments. The disclosure's scope is, of course, defined in the language in which the appended claims are expressed.

What is claimed is:

1. A method for providing anatomical distance measurements during an endoscopic procedure, comprising:
   placing first markings on a distal end of an elongate tool, the first markings extending longitudinally along the tool and configured to be viewable in an imaging field of view of an endoscope;
   extending the elongate tool through the endoscope until the first markings are viewable in the imaging field of view;
   displaying one or more captured camera images of a surgical site on at least one display device, the one or more captured camera images including an image of the elongate tool;
   overlaying virtual markings onto the one or more captured camera images, the virtual markings including reference lines spaced apart at known intervals from one another and extending longitudinally along the image of the elongate tool in the displayed one or more captured camera images; and
   measuring anatomical distances based on the first markings and the overlaid virtual markings.

2. The method of claim 1, wherein the first markings are physical lines on the tool transverse to a longitudinal axis of the tool, the lines placed 1 mm apart longitudinally along opposite sides of the tool.

3. The method of claim 1, wherein the first markings include a set of minor marking lines spaced 1 mm apart and a set of major marking lines spaced 5 mm apart longitudinally along at least one side of the tool.

4. The method of claim 1, wherein the tool has a width with second markings placed on the tool and extending across the width of the tool, wherein the first markings and the second markings are visually different.

5. The method of claim 1, wherein the first markings include a geometric pattern painted on the tool, wherein regions of the geometric pattern have known dimensions, wherein the method further comprises determining size and/or position of an unknown object in the field of view by comparing viewed dimensions of the unknown object to the known dimensions of the geometric pattern on the tool.

6. The method of claim 1, wherein the first markings are grooves in or raised markings on the distal end of the elongate tool.

7. The method of claim 1, wherein the first markings include reference lines spaced equidistantly apart, and extend longitudinally along the tool.

8. The method of claim 7, further including displaying second virtual markings representing anatomical structures viewable in the field of view.

9. The method of claim 1, further comprising:
   sensing a tilt and/or rotation of the tool using a sensor configured to sense tilt and/or rotation of the tool so the virtual markings displayed on the one or more captured camera images remain in place relative to the tool.

10. The method of claim 1, wherein the virtual markings are scaled in size to depict depth.

11. A method for providing anatomical distance measurements during an endoscopic procedure, comprising:
    extending an elongate tool through an endoscope, the elongate tool having first markings on a distal end thereof, the first markings extending longitudinally along the tool and configured to be viewable in an imaging field of view of the endoscope,
    displaying one or more captured camera images of a surgical site on at least one display device, the one or more captured camera images including an image of the elongate tool;
    overlaying virtual markings onto the one or more captured camera images, the virtual markings including reference lines spaced at known intervals and extending longitudinally along the elongate tool in the displayed one or more captured camera images;
    scaling the virtual markings in size based on a determined depth of the elongate tool within the surgical site, and
    measuring anatomical distances based on the first markings and the overlaid virtual markings.

12. The method of claim 11, wherein the first markings are physical lines on the tool transverse to a longitudinal axis of the tool, the lines placed 1 mm apart longitudinally along opposite sides of the tool.

13. The method of claim 11, further comprising:
    detecting rotation and/or axial movement of the elongate tool; and
    adjusting the overlaid virtual markings to remain in place relative to the elongate tool as the tool is rotated and moved axially.

14. The method of claim 11, further comprising:
    overlaying a pointer onto the one or more captured camera images;
    detecting movement of the pointer to select a first point and a second point in the one or more captured camera images; and
    calculating and displaying a distance between the first point and the second point based on the first markings and overlaid virtual markings.

15. The method of claim 11, wherein the elongate tool comprises a geometric pattern having known dimensions, and wherein the method further comprises:
    determining a size and/or position of an anatomical structure in the surgical site by comparing viewed dimensions of the anatomical structure to the known dimensions of the geometric pattern.

16. A method for providing anatomical distance measurements during an endoscopic procedure, comprising:
    extending an elongate tool through an endoscope, the elongate tool having a shaft, displaying one or more captured camera images of a surgical site on at least one display device, the one or more captured camera images including an image of the elongate tool shaft;
overlaying virtual markings onto the displayed image of the elongate tool shaft, the virtual markings including reference lines spaced at predetermined intervals along the shaft;
detecting rotation and/or axial movement of the elongate tool;
adjusting the overlaid virtual markings to remain in place relative to the elongate tool shaft as the tool is rotated and moved axially;
scaling the virtual markings in size based on a determined depth of the elongate tool within the surgical site; and
measuring anatomical distances based on the overlaid Virtual markings.

\* \* \* \* \*